United States Patent
Biehler

(12) 
(10) Patent No.: US 6,247,314 B1
(45) Date of Patent: *Jun. 19, 2001

(54) APPARATUS AND METHOD FOR CONTINUOUSLY DISPOSING OF CONDENSATE IN A FLUID COMPRESSOR SYSTEM

(75) Inventor: Devin D. Biehler, Mocksville, NC (US)

(73) Assignee: Ingersoll-Rand Company, Phillipsburg, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,792

(22) Filed: Jan. 30, 1998

(51) Int. Cl.$^7$ .................................................. F01B 31/00
(52) U.S. Cl. ............................. 60/657; 417/313; 417/364
(58) Field of Search ............................. 60/657; 417/313, 417/364

(56) References Cited

U.S. PATENT DOCUMENTS

| | | |
|---|---|---|
| 2,017,408 | 10/1935 | Hasche . |
| 4,112,968 | 9/1978 | Hoffman et al. . |
| 4,602,680 | 7/1986 | Bradford . |
| 4,779,640 | 10/1988 | Cummings et al. . |
| 4,838,343 | 6/1989 | Bogue . |
| 5,056,601 | * 10/1991 | Grimmer .......................... 417/364 X |
| 5,096,389 | * 3/1992 | Grady .................................... 417/364 |
| 5,145,000 | 9/1992 | Kluppel . |
| 5,240,386 | 8/1993 | Amin et al. . |
| 5,287,916 | 2/1994 | Miller . |

FOREIGN PATENT DOCUMENTS 2 268 211    4/1975   (FR) .

* cited by examiner

*Primary Examiner*—Hoang Nguyen

(57) ABSTRACT

A fluid compressor apparatus includes a compressor for delivering a compressed fluid having a fluid pressure, whereby the compressed fluid includes a volume of liquid entrained in the compressed fluid. The apparatus also includes a prime mover for driving the compressor, the prime mover having an exhaust system which vents high temperature exhaust fluid. The exhaust system includes an exhaust pipe with a first exhaust pipe end and a second exhaust pipe end. A main separator is in fluid communication with the compressor for receiving the compressed fluid and separating the liquid entrained therein from the compressed fluid. The main separator includes an outlet for discharging the compressed fluid after all of the liquid has been substantially removed therefrom. The apparatus also preferably includes at least one continuous liquid separator for receiving the fluid discharged from the main separator, separating any of the volume of liquid remaining in the compressed fluid, discharging the compressed fluid from the apparatus through a compressed fluid conduit and continuously disposing of the volume of liquid through a liquid conduit. The apparatus has at least one liquid conduit for each of the at least one continuous liquid separators. Each liquid conduit interconnects one of the continuous liquid separators to the exhaust pipe between the first and second exhaust pipe ends. Each liquid conduit provides a flow path for the separated liquid as the continuous liquid separators are continuously purged by the compressed fluid pressure.

19 Claims, 1 Drawing Sheet

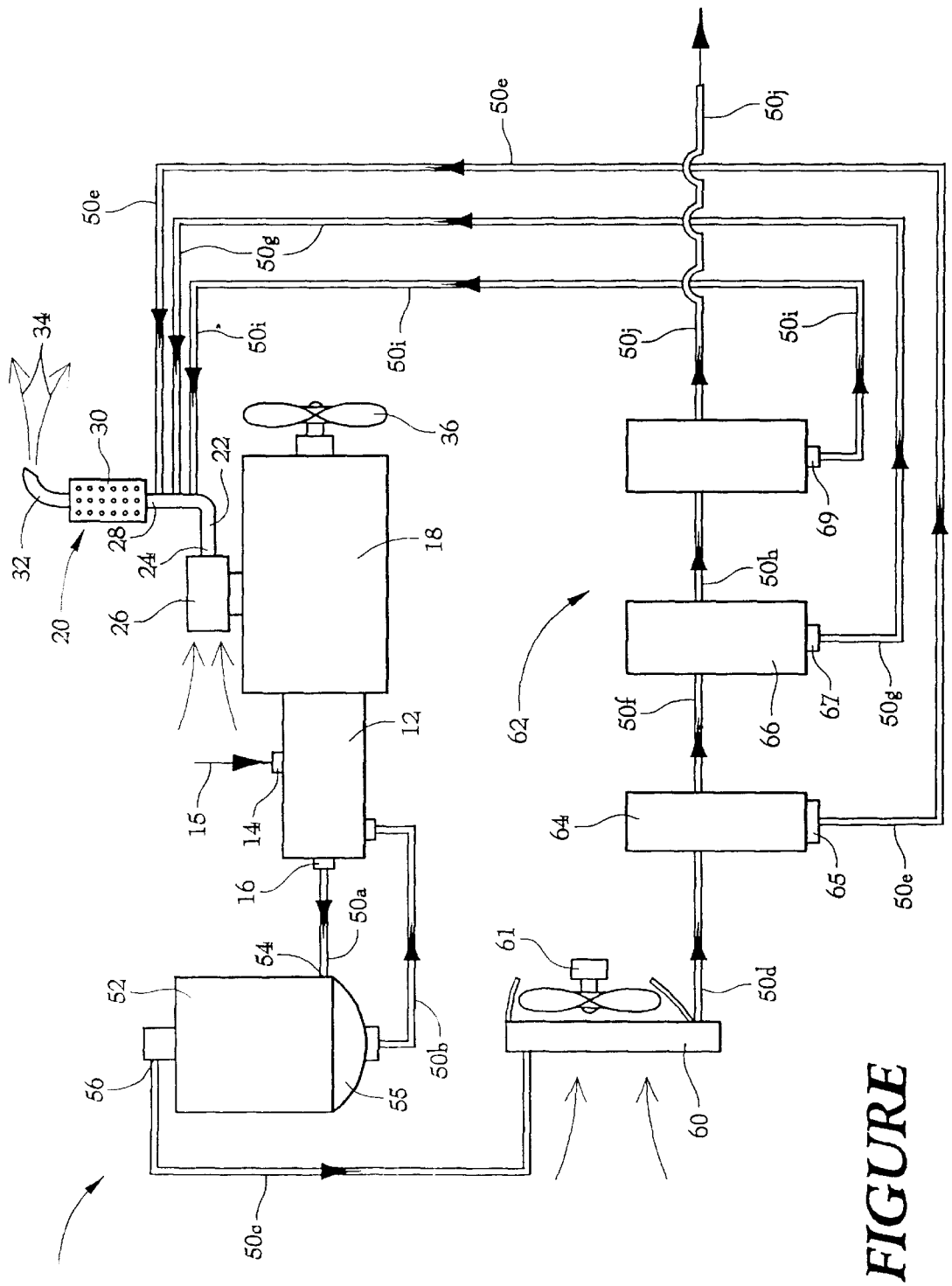
FIGURE

APPARATUS AND METHOD FOR CONTINUOUSLY DISPOSING OF CONDENSATE IN A FLUID COMPRESSOR SYSTEM

BACKGROUND

The invention generally relates to oil-flooded fluid compressors, and more particularly to an apparatus and method for continuously disposing of liquid condensate in an oil-flooded fluid compressor driven by a prime mover having an exhaust system, and wherein liquid mixed with the compressed fluid is separated from the compressed fluid by at least one liquid separating means, the at least one liquid separating means is continuously purged by compressed system pressure and as a result, the liquid condensate is continuously flowed to the exhaust system, is vaporized by the hot exhaust fluid, and is entrained in the discharged exhaust fluid stream.

During operation of a conventional oil-flooded fluid compressor, oil is injected into the compressor's compression module to reduce the temperature of the hot, compressed fluid, which is typically air. The injected oil and other liquids that are entrained with the compressed fluid must be separated from the compressed fluid before the compressed fluid is supplied to an object of interest such as a pneumatic tool.

Typical fluid compressor systems include an oil-flooded compressor, an aftercooler and an afterfiltration or separation device. The aftercooler and afterfiltration devices are most typically used to respectively reduce the temperature of the compressed fluid, and to separate the liquids from the compressed fluid. The liquid collected during the aftercooling and afterfiltering is flowed from the compressed fluid system to a drum or other suitable holding vessel and is collected in the vessel. The liquid collected in the vessel must then be disposed of from time to time. The collected liquid is frequently considered a hazardous material, which may only be disposed of after either complying with a required disposal procedure or chemically treating the liquid in some manner. As a result, disposal of the separated liquid using such a traditional collection and disposal method is typically quite burdensome and expensive.

One prior art fluid compression system described in U.S. Pat. No. 5,287,916 attempts to overcome the shortcomings associated with traditional collection and disposal methods. Generally, in the '916 patent, the separated liquid is collected in a holding vessel, and periodically, upon reaching a predetermined liquid collection level, is injected by compression system pressure into the exhaust system of a compressor prime mover which causes the liquid to be converted to vapor and entrained in the prime mover exhaust fluid.

Although this system effectively overcomes the shortcomings of the traditional collection and disposal methods, this collection and disposal method also has associated shortcomings. When the system is operated in below freezing ambient temperatures the liquid in the holding vessel can freeze and as a result, each holding vessel must include a heater at an additional cost, to prevent liquid freezing which may damage the holding vessel. In addition to this shortcoming, the apparatus for collecting and injecting the separated liquid from the holding vessel to the exhaust system can be expensive and the mechanism can be unreliable. When the injection apparatus is not functioning properly, the compressed fluid delivered to an object of interest will include an undesirable volume of liquid. A third shortcoming of the system disclosed in the '916 patent is that if there are two or more holding vessels associated with the aftercooler/after filtration devices, each with a condensate drain, each at slightly different pressures due to compressed fluid system component pressure drop, in order for the holding vessels to function properly, it is necessary for the system to include either a separate collection/injection device for each condensate drain, or a series of check valves and timed solenoids to sequentially purge each holding vessel. Such an arrangement significantly increases the system cost, complexity and reliability. Associated with this third shortcoming is the inability of the prior system to be purged automatically. Upon shutdown of the system, the collection/injection devices(s) must be purged of any remaining liquid, either manually or with a solenoid type device, to prevent damage in freezing environments. If the compressor operator forgets to purge the collection system and flow lines, the liquid can freeze in the device(s) and cause significant damage.

The foregoing illustrates limitations known to exist in present devices and methods. Thus, it is apparent that it would be advantageous to provide a condensate disposal system to dispose of the liquid condensate which is continuous, automatic, reliable, and minimizes the possibility of condensate disposal system failure during cold (below freezing) operation. Accordingly, a suitable alternative is provided including features more fully disclosed hereinafter.

SUMMARY OF THE INVENTION

In one aspect of the present invention, this is accomplished by providing an apparatus and method for continuously disposing of condensate in a fluid compressor system with a system pressure, a compressor for delivering a compressed fluid end and a second exhaust pipe end; a main separator in fluid communication with the compressor for receiving the compressed fluid and substantially separating the liquid entrained therein from the compressed fluid, the main separator including an outlet for discharging the compressed fluid after substantially all of the liquid has been removed therefrom; at least one continuous liquid separator for receiving the fluid discharged from the main separator, separating any of the volume of liquid remaining in the compressed fluid and continuously disposing of the volume of liquid through a liquid conduit; the liquid conduit flow connecting the at least one continuous liquid separator to the exhaust pipe between the first and second exhaust pipe ends, the at least one liquid conduit providing a flow path for the separated liquid as the at least one continuous liquid separator is continuously purged by the system pressure.

In operation, the separated liquid is conveyed continuously by system pressure from the respective at least one separating means, through the respective continuous flow orifice drain through the respective conduit and is introduced into the exhaust fluid stream. The exhaust fluid which is at a temperature that is higher than the temperature of the separated liquid vaporizes the separated liquid which is entrained with the exhaust fluid and discharged. Upon compressor shutdown, the separating means and conduits are automatically purged by the compressed fluid pressure, thereby preventing damage to the conduits and separating means due to liquid freezing.

The foregoing and other aspects will become apparent from the following detailed description of the invention when considered in conjunction with the accompanying drawing figures.

DESCRIPTION OF THE DRAWING FIGURES

The FIGURE illustrated in the drawing is a schematic representation of the apparatus constructed in accordance with the present invention.

DESCRIPTION OF THE PREFERRED EMBODIMENT

Turning now to the FIGURE which schematically illustrates compressed fluid system 10 which includes the apparatus of the present invention. The apparatus includes a fluid compressor 12 which is an oil-injected positive displacement type compressor such as an oil-flooded rotary screw compressor, or an oil injected reciprocating compressor. Oil is injected into the compression module during compression of the fluid and serves to cool the fluid during compression. Compressor 12 has an fluid inlet 14 whereby uncompressed fluid, such as air, enters the compressor in the direction of arrow 15; and an outlet 16 through which a mixture of compressed fluid, and liquid, such as oil and water, flows out of the compressor.

Compressor prime mover 18 is disposed in motive force transmitting relation to compressor 12 to power the compressor for use in the compressed fluid system 10. In the preferred embodiment, the compressor drive means 18 is a combustion engine such as a diesel or gasoline engine. However, the prime mover may be any suitable engine provided the prime mover includes an exhaust system 20 which vents an exhaust fluid at a high temperature to atmosphere outside the compressed air system 10.

Exhaust system 20 includes an exhaust pipe 22 with a first end 24 flow connected to a turbocharger 26 or other combustion means, and a second end 28 flow connected to a muffler means 30; and a tail pipe 32 flow connected to the discharge end of the muffler means and provides a flow path for exhausted fluid from the compressed fluid system to atmosphere in the direction of arrows 34. The exhaust fluid must be of sufficient temperature to vaporize a liquid condensate mixture such as a mixture of oil and water that is produced during fluid compression and is supplied to the exhaust pipe 22 from the compressor.

Fan 36 is rotatably mounted on, and powered by, prime mover 18. The fan 36 serves to draw cooling air across the compressed fluid system 10 during system operation.

The compressed fluid and liquid mixture is flowed to separator 52 through conduit 50a which flow connects the compressor discharge 16 and the inlet 54 of separator tank 52. The separator tank serves to separate the lubricant component of the mixture from the compressed fluid. The separated lubricant is collected in separator tank sump region 55, is conventionally scavenged back to compressor 12 through scavenge line 50b, and is reinjected into the compressor. The mixture of compressed fluid and any additional remaining fluid is flowed out of the separator tank discharge outlet 56 through conduit 50c. The separator is of the type well known to one skilled in the related art and therefore no additional disclosure is required.

The mixture in conduit 50c is flowed into a conventional heat exchanger aftercooler 60. The relatively high temperature mixture is cooled as it passes through the aftercooler. Fan 61 draws ambient air through the aftercooler to cool the mixture in a conventional manner.

The cooled mixture is delivered to the continuous liquid disposal system 62 by conduit 50d which flow connects the aftercooler outlet and the inlet of first continuous liquid separating means 64. For purposes of clarity and brevity, the first continuous liquid separating means 64 shall be referred to below as either "first means" or "first means 64". The continuous liquid disposal system is comprised of at least one continuous liquid separating means. For purposes of describing the preferred embodiment of the invention continuous disposal system 62 is comprised of first second and third continuous liquid separating means 64, 66, and 68 respectively. Also for purposes of clarity and brevity, the second and third continuous liquid separating means 66 and 68 shall be referred to below as either "second means" and "third means" or "second means 66" and "third means 68".

The first, second and third means each has a respective volume, and these volumes may be the same or different. In the preferred embodiment the volumes of the second and third means are equal and the first volume is smaller than the second and third volumes.

First means 64 is a conventional moisture separator, and second and third means 66 and 68 are coalescing filters. The first, second and third means have respective constant bleed orifice drains 65, 67, and 69 respectively which permit the separated liquid to continuously be drained from the respective means 64, 66 or 68. In this way, no additional apparatus is required for flowing the liquid from the separating means to the exhaust system 20. Each constant bleed orifice has a different diameter, the orifice 65 being the largest diameter orifice and the orifice 69 being the smallest diameter orifice.

As shown in the FIGURE, the outlet of first means 64 is flow connected to the inlet of second means 66 by conduit 50f, the outlet of second means 66 is flow connected to the inlet of third means 68 by flow conduit 50h, and the substantially liquid free compressed fluid is flowed out the compressed fluid system to a pneumatic tool or another object of interest through discharge conduit 50j which is flow connected to the outlet of third means 68.

Flow conduit 50e flow connects the constant bleed orifice 65 of first means 64 to the exhaust pipe 22 between the exhaust pipe ends 24 and 28. Similarly, flow conduit 50g flow connects the constant bleed orifice 67 of the second means 66 to the exhaust pipe 22, and conduit 50i flow connects the constant bleed orifice of third means 68 to the exhaust pipe 22, between the ends 24 and 28.

The liquid separated and coalesced by continuous separating means 64, 66 and 68 and by the system pressure continuously flows out of the respective disposal means through the respective constant bleed orifices and conduit to the exhaust pipe where the liquid is vaporized by the high temperature exhaust fluid. By the present invention, continuous purging of the liquid condensate is achieved therefore no condensate traps, solenoid valves, or other actuating means are required. The present invention prevents freezing problems associated with conventional condensate disposal systems.

Operation of the compressed fluid system 10 and the present invention will now be described.

The ambient fluid flows into compressor 12 through inlet 14 and is compressed. During compression a lubricant such as oil is injected with the compressed fluid to cool the fluid during compression. The mixture of compressed fluid, lubricant and other liquids flows out of the compressor to separator tank 52 and the lubricant is separated from the mixture by the separator. The separated lubricant is scavenged back to compressor in a conventional manner.

After the mixture passes through aftercooler 60 and is cooled, it continues to the disposal apparatus 62.

The mixture of compressed fluid and liquid first passes through first means 64, and the liquid is separated from the compressed fluid. The means 64 is continuously purged by the system pressure and the separated liquid is forced to the exhaust pipe 22 through dedicated conduit 50e and is mixed with the high temperature exhaust fluid. As a result, the separated liquid is vaporized, entrained with the exhaust fluid and discharged to atmosphere.

The substantially liquid free compressed fluid flows from first means outlet through conduit 50f to second means 66. The liquid component of the mixture is coalesced from the mixture by the second means. Second means 66 is continuously purged by the system pressure and as a result the coalesced fluid is forced through dedicated conduit 50g to exhaust pipe 22 exhaust stream. The coalesced liquid is mixed with the high temperature exhaust fluid, is vaporized and the coalesced liquid is discharged to atmosphere out the tail pipe 32.

Finally, the substantially liquid free compressed fluid is flowed from the second means outlet and into the inlet of third means 68. Any liquid remaining in the mixture is coalesced by means 68, and the dry compressed fluid is supplied to an object of interest such as a pneumatic tool through supply conduit 50j. As the third means is continuously purged by the system pressure, the liquid coalesced by third means 68 is continuously forced to exhaust pipe 22 via dedicated conduit 50i. The coalesced liquid is injected into the exhaust flow stream and is vaporized by the stream and discharged with the exhaust fluid to atmosphere.

The flow pressures in the conduits 50e, 50g, and 50i are considerably lower than the compressor discharge pressure, therefore reverse flow is prevented.

When the compressed system is shutdown, the first, second, and third means 64, 66, and 68 and their respective flow conduits continue to be bled and purged in the manner previously described. The present invention allows for purging of the conduits and separators without additional valving.

In summary, the present invention provides a continuous purging of the liquid condensate which is therefore less likely to freeze during cold weather operation, as compared to liquid that is collected in a trap or other vessel. The present invention has no moving parts to wear out or fail. The present invention upon shutdown of the compressor is self purging during compressor shutdown and blowdown, and as a result, very little liquid condensate remains in the system, thereby eliminating the need for manual or automatic solenoid type purge drains.

While I have illustrated and described a preferred embodiment of my invention, it is understood that this is capable of modification, and I therefore do not wish to be limited to the precise details set forth, but desire to avail myself of such changes and alterations as fall within the purview of the following claims.

Having described the invention, what is claimed is:

1. A fluid compressor apparatus, comprising:
   a) compressor means for delivering a compressed fluid having a fluid pressure, said compressed fluid including a volume of liquid entrained in the compressed fluid;
   b) drive means for driving the compressor means, said drive means having an exhaust system which vents high temperature exhaust fluid, said exhaust system having an exhaust pipe with a first exhaust pipe end and a second exhaust pipe end;
   c) a main separator in fluid communication with said compressor for receiving said compressed fluid and substantially separating the liquid entrained therein from the compressed fluid, said main separator including an outlet for discharging said compressed fluid after substantially all of the liquid has been removed therefrom;
   d) at least one continuous liquid separator means for receiving the fluid discharged from said main separator, separating any of the volume of liquid remaining in the compressed fluid, discharging the compressed fluid from the apparatus through a compressed fluid conduit and continuously disposing of the volume of liquid through a liquid conduit using; and
   e) the liquid conduit flow connecting the at least one continuous liquid separator means to the exhaust pipe between the first and second exhaust pipe ends, said liquid conduit providing a flow path for the separated liquid as the at least one continuous liquid separator means is continuously purged by the compressed fluid pressure.

2. The fluid compressor apparatus as claimed in claim 1, wherein the at least one continuous liquid separator means includes a single moisture separator and the at least one liquid conduit means includes a single conduit.

3. The fluid compressor apparatus as claimed in claim 1, wherein the at least one continuous liquid separator means includes three continuous liquid separator means and the at least one liquid conduit means includes three liquid conduits.

4. The fluid compressor apparatus as claimed in claim 3, wherein a first one of the continuous liquid separator means includes a moisture separator and the other two continuous liquid separator means include coalescing filters.

5. The fluid compressor apparatus as claimed in claim 3, wherein each said continuous liquid separator means has a constant bleed orifice drain.

6. The fluid compressor apparatus as claimed in claim 3, wherein the first continuous liquid separator means includes a moisture separator, the second continuous liquid separator means is located downstream from the first continuous liquid separator means and includes a coalescing filter, and the third continuous liquid separator means is located downstream from the second continuous liquid separator means and includes a coalescing filter, the first and second liquid separator means being flow connected by a first flow conduit and the second and third liquid separator means being flow connected by a second flow conduit, the first, second, and third continuous liquid separator means each having a constant bleed orifice drain having a diameter, the diameter of the orifice drain for the first continuous liquid separator means having the largest diameter orifice and the diameter of the orifice drain for the third continuous liquid separator being the smallest diameter orifice.

7. The fluid compressor apparatus as claimed in claim 3, wherein each said continuous liquid separator means has a different volume.

8. The fluid compressor apparatus as claimed in claim 7, wherein the first continuous liquid separator means has a first volume, and the second and third continuous liquid separator means have respective second and third volumes and wherein the second and third volumes are equal and the first volume is smaller than the second and third volumes.

9. The fluid compressor apparatus as claimed in claim 1 wherein the compressed gas is discharged at a compressed gas pressure, and the exhaust is discharged at an exhaust pressure, and wherein the pressure of the compressed gas is greater than the pressure of the exhaust vapor.

10. The fluid compressor apparatus as claimed in claim 1 wherein the compressor means is an oil-flooded rotary screw compressor and the prime mover means is a diesel engine.

11. In a fluid compressor system with a system pressure, a compressor for delivering a compressed fluid including a volume of liquid entrained in the compressed fluid; a prime mover for driving the compressor, the prime mover having an exhaust system which vents high temperature exhaust fluid, the exhaust system having an exhaust pipe with a first exhaust pipe end and a second exhaust pipe end; a main separator in fluid communication with said compressor for receiving said compressed fluid and substantially separating the liquid entrained therein from the compressed fluid, said main separator including an outlet for discharging said compressed fluid after substantially all of the liquid has been removed therefrom; at least one continuous liquid separator means for receiving the fluid discharged from said main separator, separating any of the volume of liquid remaining in the compressed fluid, discharging the compressed fluid from the apparatus through a compressed fluid discharge conduit and continuously disposing of the volume of liquid through a liquid conduit the liquid conduit flow connecting the at least one continuous liquid separator means to the exhaust pipe between the first and second exhaust pipe ends, said liquid conduit providing a flow path for the separated liquid as the at least one continuous liquid separator means is continuously purged by the system pressure, a method for continuously disposing of separated liquid, the method comprising:

a) flowing the mixture of compressed fluid and liquid to the main separator for substantially separating the liquid from the compressed fluid;

b) flowing the compressed fluid and any of the liquid remaining therein to each of the at least one continuous liquid separating means thereby separating the remaining liquid from the compressed fluid;

c) conveying the separated liquid continuously by system pressure from the respective at least one continuous liquid separating means, through the liquid conduit; and d) introducing the separated liquid into the exhaust fluid stream for vaporizing the separated liquid.

12. The method as claimed in claim 11 comprising the further step of:

e) shutting down the compressor and continuously purging the continuous liquid separator means and conduits.

13. A fluid compressor apparatus, comprising:

a) a compressor for delivering a compressed fluid having a fluid pressure, said compressed fluid including a volume of entrained liquid in the compressed fluid;

b) a drive unit for driving the compressor, said drive unit having an exhaust system which vents high temperature exhaust fluid, said exhaust system having an exhaust pipe with a first exhaust pipe end and a second exhaust pipe end;

c) a main separator in fluid communication with said compressor for receiving said compressed fluid and substantially separating the entrained liquid therein from the compressed fluid, said main separator including an outlet for discharging said compressed fluid after substantially all of the liquid has been removed therefrom;

d) a continuous liquid separator for receiving the fluid discharged from said main separator, separating substantially all of the volume of liquid remaining in the compressed fluid, discharging the compressed fluid from the apparatus through a compressed fluid conduit and continuously disposing of the separated remaining liquid through a liquid conduit using; and e) a liquid conduit connecting the continuous liquid separator to the exhaust pipe between the first and second exhaust pipe ends, said liquid conduit providing a flow path for the separated remaining liquid as the continuous liquid separator is continuously purged by pressure from the compressed fluid.

14. The fluid compressor apparatus of claim 13, further comprising a second continuous separator.

15. The fluid compressor apparatus of claim 13, wherein the continuous separator comprises a moisture separator.

16. The fluid compressor of claim 13, wherein the continuous separator comprises a coalescing filter.

17. The fluid compressor apparatus of claim 13, wherein the compressor comprises an oil-flooded rotary screw compressor.

18. In a fluid compressor system with a system pressure, a compressor for delivering a compressed fluid including a volume of entrained liquid; a prime mover for driving the compressor, the prime mover having an exhaust system for venting high temperature exhaust fluid, a method for continuously disposing of separated liquid, the method comprising the steps of:

a) flowing the mixture of compressed fluid and liquid delivered by the compressor to a main separator;

b) substantially separating the liquid from the compressed fluid in the main separator;

c) flowing the compressed fluid and any remaining liquid contained therein to a continuous liquid separator;

d) separating substantially all of the remaining liquid from the compressed fluid in the continuous separator;

e) continuously conveying the separated liquid by system pressure from the respective continuous liquid separator, to an exhaust system; and f) vaporizing the separated liquid in the exhaust system.

19. The method of claim 17, further comprising the step of:

g) continuously purging the continuous separator during shutdown of the compressor.

* * * * *